UNITED STATES PATENT OFFICE.

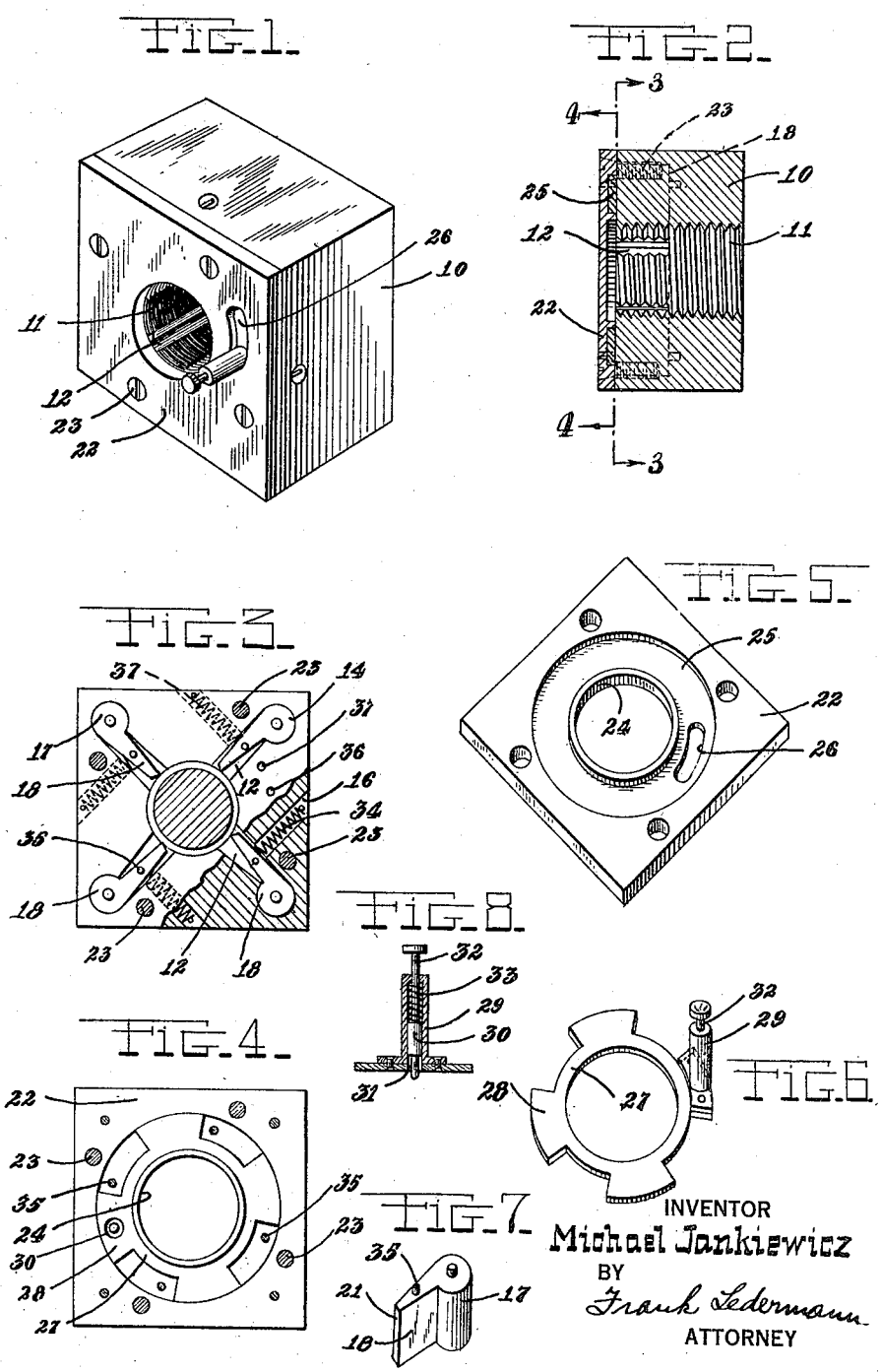

MICHAEL JANKIEWICZ, OF ELMHURST, NEW YORK.

NUT-LOCK.

1,320,865.     Specification of Letters Patent.     Patented Nov. 4, 1919.

Application filed May 23, 1919. Serial No. 299,180.

*To all whom it may concern:*

Be it known that I, MICHAEL JANKIEWICZ, a citizen of Russia, residing at Elmhurst, county of Queens, and State of New York, have invented certain new and useful Improvements in Nut-Locks, of which the following is a specification.

This invention relates to improvements in nut locks, and its principal object resides in the provision of a secure fastening means for preventing nuts from backing off of bolts and the like.

Another object of the invention resides in the provision of a means for releasing the locking means in order to permit the nut to be removed.

With these and other objects in view, as will become apparent as the description proceeds, the invention consists in the novel construction, combination and arrangement of parts, as will be fully set forth in the following specification, claimed and illustrated in the accompanying drawings in which:

Figure 1 is a perspective view of a nut equipped with this improved locking means.

Fig. 2 is a sectional view through the device.

Fig. 3 is a view partly in section taken on line 3—3 of Fig. 2.

Fig. 4 is a sectional view on line 4—4 of Fig. 2.

Fig. 5 is a detail perspective view of the cover plate.

Fig. 6 is a detail perspective view of the releasing ring, and,

Fig. 7 is a detail perspective view of one of the locking dogs.

Fig. 8 is a detail view, partly in section of the plunger and the parts coöperating therewith.

Referring to the drawings in detail, the numeral 10 designates a nut provided with the usual screw threaded aperture 11. A plurality of radially disposed recesses 12 are formed in one end face of the nut, these recesses terminating at their outer ends in circular recesses for the reception of the barrels of the locking dogs.

Apertures 16 arranged perpendicularly to the recesses 12, are formed in the nut as will be clearly seen upon reference to Fig. 3.

The locking dogs comprise barrels 17 having integrally formed tongues 18. It will be noted that one face of each tongue is arranged tangential to the barrel while the opposite face is arranged radial to the barrel. As shown in Fig. 3 the barrels of these locking dogs are pivotally mounted in the recesses 14 while the tongues project through the recesses 12 and partially into the threaded aperture 11. It will be noted that the outer end face 21 of each of the tongues is beveled to form a relatively sharp edge which will bite into the threads on a bolt when the device is locked.

A cover plate 22 is adapted to be secured to the recessed end of the nut 10 by means of suitable screws 23. This plate is formed with a central aperture 24 which alines with the aperture 11 of the nut when the plate is in place, and an annular groove 25 is formed in the inner face of said plate to accommodate the releasing ring shown in Fig. 6. An arcuate slot 26 is formed in the plate between the inner and outer walls of the groove 25 and is adapted to receive the stem by means of which the releasing ring is manipulated.

The releasing ring previously referred to is best illustrated in Fig. 6 and comprises a ring 27 having formed integral therewith a plurality of spaced radial arms 28. One of these arms has secured to its outer face a barrel 29 formed with a bore 30 which alines with an aperture 31 formed in the arm to which the barrel is secured.

A plunger 32 is slidable in the bore 30 and is normally urged inwardly toward the nut by means of a spring 33. A plurality of springs 34 are arranged in the apertures 16 in the nut and are adapted to yieldingly hold the locking dogs in position to engage the shank of a bolt, while pins 35 are secured in the outer ends of the locking dogs, and are adapted to be engaged by the radial arms 28 on the ring 27 when the same is rotated to release the lock.

In operation it will be understood that the device is assembled in the manner illustrated in Figs. 1 and 2. The nut may then be threaded upon a bolt and as long as the nut is turned in a direction to feed the same on the bolt it is free to rotate. As soon, however, as an attempt is made to back the nut off of the bolt it will be seen that the dogs 18 will bite into the bolt and hold the nut against rotation.

When it is desired to remove the nut the plunger 32 is moved against the pressure of the spring 33 and out of the aperture 36 and the ring 27 is given a partial rotation, thus causing the arms 28 to engage the pins 35 and release the dogs so the nut may be released. It will be understood that the plunger may be permitted to enter the other apertures 37 and thus the ring will be held in its releasing position against the tension of the springs 34.

While in the foregoing there has been shown and described the preferred embodiment of this invention, certain minor changes in the construction, combination and arrangement of parts may be resorted to without departing from the spirit and scope of the invention as claimed.

What I claim as new and desire to secure by Letters Patent, is:

A nut lock comprising a nut body having a threaded aperture therethrough and radial recesses communicating with the aperture, locking dogs pivoted in the recesses, springs urging said dogs into locking position, pins carried at the outer ends of said dogs, a plate secured to the recessed end of said body, said plate having an annular groove therein to accommodate the pins, a ring rotatable in the groove, arms on the ring to engage said pins upon rotation of the ring, a barrel on one of said arms, and a spring-controlled plunger adapted to enter said barrel, and a bore in one of said arms, to move the ring and also adapted to enter another bore in one of said arms to hold said ring against accidental movement.

In testimony whereof I have affixed my signature.

MICHAEL JANKIEWICZ.

Copies of this patent may be obtained for five cents each, by addressing the "Commissioner of Patents, Washington, D. C."